May 2, 1961  J. J. EXON  2,982,895
LIQUID LEVEL SENSOR
Filed March 4, 1957  3 Sheets-Sheet 1

INVENTOR.
JOHN J. EXON
BY
ATTORNEY

May 2, 1961 J. J. EXON 2,982,895
LIQUID LEVEL SENSOR
Filed March 4, 1957 3 Sheets-Sheet 3

INVENTOR.
JOHN J. EXON
BY *James B. Stoutz*

ATTORNEY

United States Patent Office 2,982,895
Patented May 2, 1961

2,982,895

LIQUID LEVEL SENSOR

John J. Exon, Minneapolis, Minn., assignor to Minneapolis-Honeywell Regulator Company, Minneapolis, Minn., a corporation of Delaware Filed Mar. 4, 1957, Ser. No. 643,674

7 Claims. (Cl. 317—246)

This invention relates to a device for sensing the level of fluent materials. More particularly, the present sensing device comprises a plurality of tubular electrodes or plates accurately and positively spaced by balls made of a heat resisting electrically insulating material, electrodes themselves preferably being made of metal. The resulting device may be subjected to extremes of temperature without damage, is accurate, resistant to mechanical shock and is simple and easy to construct. Preferably, the electrical characteristics of the device are taken into account in determining the spacing of the electrodes. It is therefore an object of this invention to provide an improved level sensing device comprising spaced electrodes or plates.

This and other objects will become apparent upon a study of the following specification and drawings whereJn:

Figure 2 is a bottom view of the sensor shown in Figure 1;

Figures 1, 3, 4:
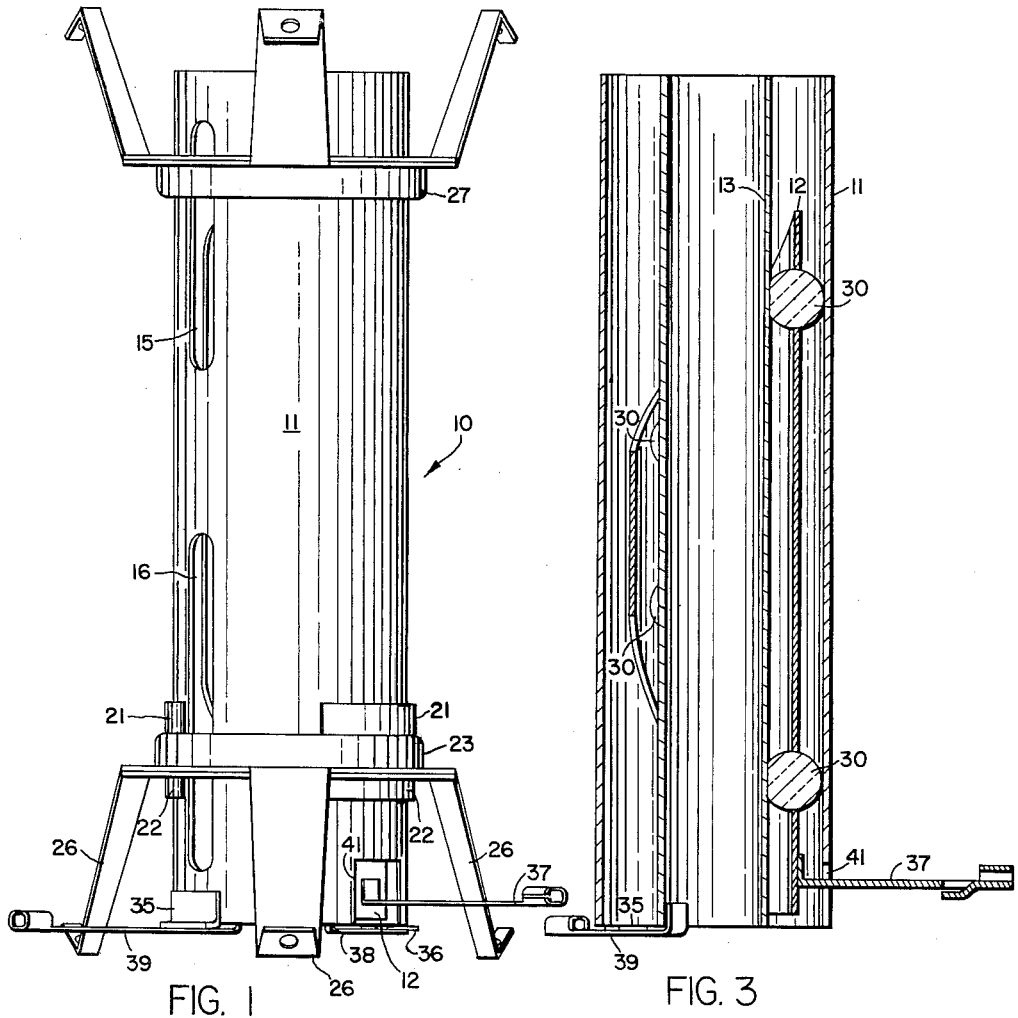
Figure 1 is an elevation view of a sensing device embodying my invention.
Figure 3 is a sectional elevation view of the device of Figure 2 taken along line 3—3 with parts omitted.
Figure 4 is a partial sectional view of the mounting means for the sensor of Figure 1.
Figure 5:
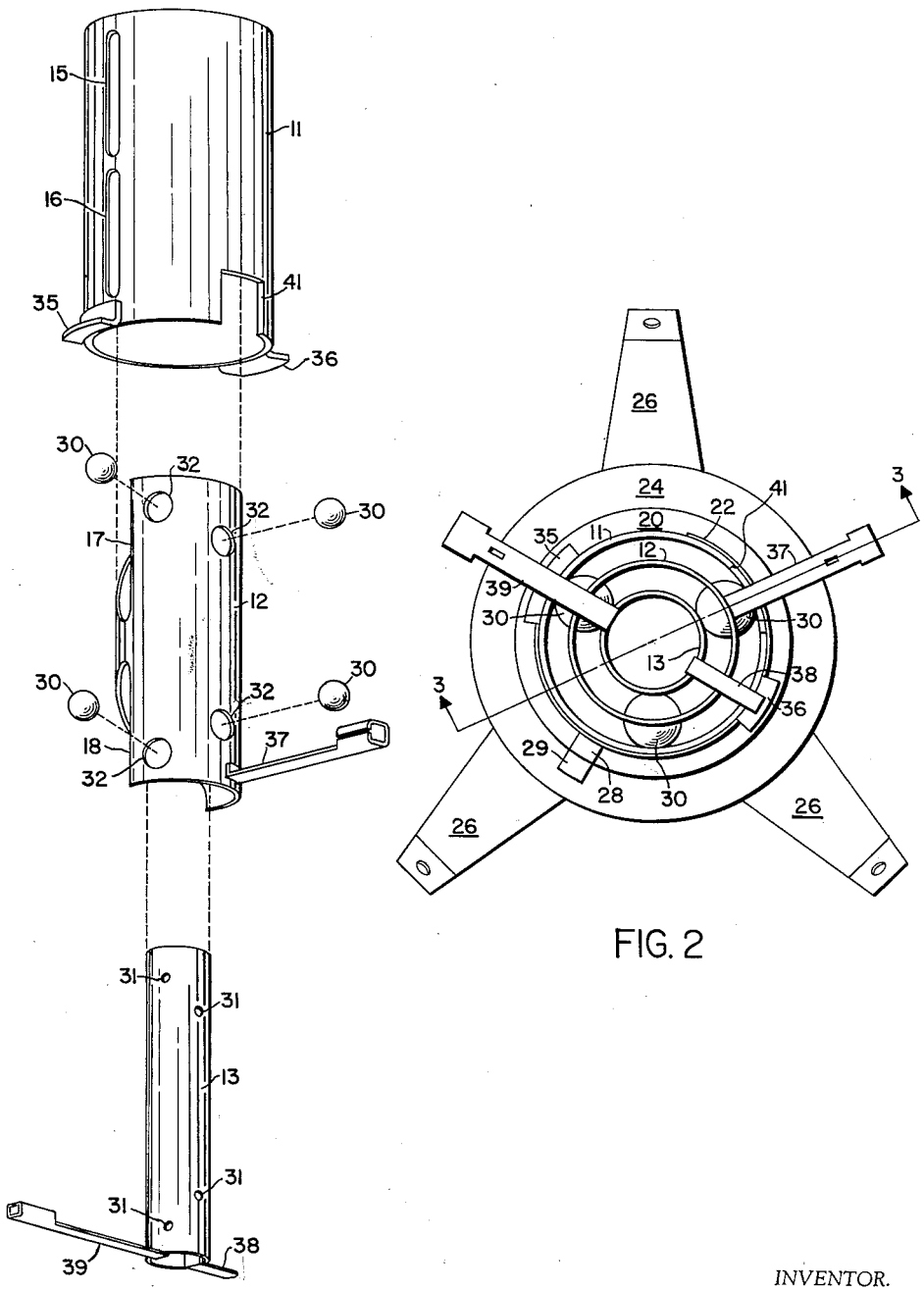
Figure 5 is an exploded view of the principal parts of the sensor of Figure 1.

The present sensing device or probe 10 is adapted to be used in an electronic circuit such as shown in the Schafer-Morley Patent No. 2,563,280, issued August 7, 1951, for sensing the level of material in a container but, obviously, it is intended to be used in any application where its features are useful. The probe 10 comprises an outer tubular member 11, an intermediate member 12 and an inner member 13, each of these members, in this preferred embodiment, being made of stainless steel although members made of any other conductive material could be used. The outer electrode 11 includes slots 15 and 16 for calibration purposes. The intermediate electrode 12 is characterized by having its area shaped to provide capacitance changes in accordance with the cross section of the container in which it is to be used and also has edges 17 and 18 adapted to cooperate with slots 15 and 16 in the calibration of the device.

The outer tube may be provided with any suitable mounting means but, in the present instance, where the device is intended to be used in a liquid oxygen converter, mounting means are provided especially adapted for this use. The mounting means used, as shown in Figures 1, 2 and 4, comprises a lower ceramic ring 20 fitted about the exterior of tube 11, this ceramic ring 20 being prevented from sliding longitudinally along the tube by stainless steel retainer rings 21 and 22 spot welded to the tube. A key portion not shown, forming a part of ring 22 coacts with a radial slot 28 in ceramic ring 20 to prevent rotation of the ring relative to the tube. An outer clamping ring comprising an upper portion 23 and a lower portion 24 are arranged to encompass the ring 20, with the parts being spot welded together upon assembly, the lower ring 24 likewise having a portion 29 extending into the radial slot in ring 20 to prevent relative rotation. The upper portion 23 includes legs 26 formed integrally therewith or attached thereto and each has a suitable configuration for attachment to the shell of the container. Obviously, when legs 26 are attached to the container, the outer tube 11 of probe 10 is securely held relative to the container, not shown. In the present instance, although not required in some cases, an upper mounting means is also provided which is similar to the mounting means just described excepting that no retainer rings 21 and 22 are provided so that the upper mounting means 27 may be slidably moved along tube 11 and thereby accommodate relative motion during assembly and due to temperature changes.

While the probe 10 has been described in terms of upper and lower portions, and is shown with the fixed mounting means at the bottom, it is likewise obvious that the device may be installed in a reverse position and parts now described as "upper" would be "lower" and vice versa. This possibility of reversal of position should, of course, be kept in mind throughout the disclosure.

The inner and intermediate tubes 13 and 12, respectively, are spaced from outer tube 11 by balls or spherical members generally designated by the numeral 30, these members being made of quartz, pyrex glass, ceramic or other suitable material. A plurality of recesses or indentations 31 are formed in inner electrode 13, these recesses being of such nature as to provide a locating seat for the individual balls. The recesses may be formed by any conventional means and, of course, must never be large enough to permit the balls to be pushed through. The intermediate tube or plate 12 has a plurality of holes 32 formed in registry with the recesses 31 of electrode 13 when these electrodes are in their desired assembled position, the holes 32 being not appreciably larger than the diameters of the balls 30.

In assembling the present apparatus, the inner tube 13 and intermediate tube 12 are nested or telescoped into their approximate desired relation and the uppermost balls 30 are then pushed through their respective holes to engage their registering recesses 31 and then the outer tube 11 is slipped over the assembly to retain the balls in this assembled relation. Thence, the remaining balls are pushed through their respective holes in electrode 12 and into engagement with their registering recesses 31 in member 13 and the tube 11 further slipped down over these balls until the entire device is fully assembled. The diameter of the balls is such that they, when fitted firmly against their recesses in tube 13, bear firmly against the inner surface of outer tube 11. In effecting the above assembly as described, the edges 17 and 18 are kept in substantial alignment with slots 15 and 16 of the outer tube 11.

Prior to the assembly above described, flange members 35 and 36 were spot welded to the bottom of tube 11. Likewise, a connector arm 37 was spot welded to a bottom portion of member 12 and a connector tab 38 and a terminal member 39 were spot welded to the inner member 13, these members being best shown in Figures 1, 2, 3 and 5. In addition, a recess 41 was formed in member 11 to adequately clear connector member 37.

Upon the assembly of the tubes as above described and with the various flanges and connecting members attached as described above, the device is then calibrated to determine its empty or dry state capacitance and if its capacitance value is not at the value desired the outer tube 11 is rotated slightly one way or the other relative to the intermediate and inner tubes until the desired capacitance is achieved, a variation taking place upon such rotation by varying the degree of overlap of slots 15 and 16 relative to edges 17 and 18. Upon the desired capacitance value being achieved, the tab 38 is brazed or welded to flange 36 and connector member 39 is likewise brazed or welded to flange 35 thereby securely fastening inner tube 13 to outer tube 11 against both rotation and longitudinal movement. Because tube 12 is prevented from rotating or longitudinally moving with respect to tube 13 by virtue of balls 30 extending through holes 32 into recesses 31, the entire assembly is positively and accurately held in assembled relation.

In the design of a device of this sort, it is noted that the inner tube 13 and outer tube 11 constitute, in effect, one plate of a capacitor or other electrical device and intermediate tube 12 constitutes the other plate of such a device. It has been determined that by making the impedance between inner tube 13 and intermediate tube 12 the same as the impedance from intermediate tube 12 to outer tube 11, any minor variations in the mechanical spacing of tube 12 relative to its surrounded tubes were of relatively little effect on the overall capacitance of the device. This type of spacing normally results in the mechanical dimensions being somewhat smaller between inner tube 13 and intermediate tube 12 than between the latter tube and the outer tube 11 thereby compensating for the additional surface on the outer tube.

Figure 6:
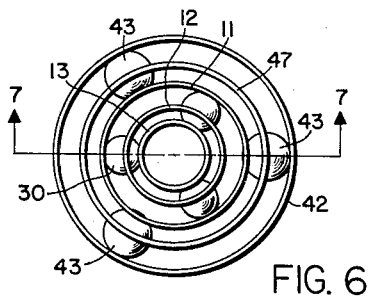
Figure 6 is a plan view of a modification of my invention.
Figure 7:
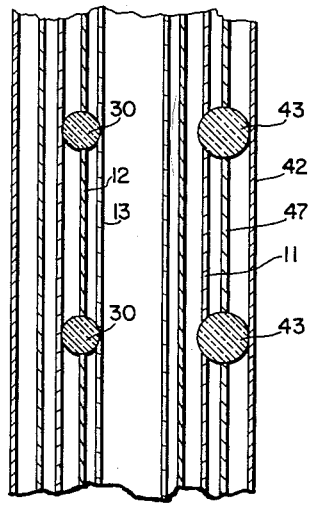
Figure 7 is a sectional elevation view of the modification shown in Figure 6 taken along line 7—7.

While only three tubes are shown in Figures 1 through 5, it is possible to use more nested or telescoped tubes if desired, one possible configuration being that shown in Figures 6 and 7 wherein, in addition to inner tube 13, intermediate tube 12 and a tube 11, an additional tube 42 and another additional tube 47 are provided, tubes 42 and 47 being held in assembled relation to the other tubes by balls 43 arranged in a manner similar to that previously described. In this case, tubes 13, 11 and 42 would normally be connected together, both mechanically and electrically, and tubes 12 and 47 would likewise be mechanically and electrically connected thereby forming the electrodes on a capacitance or other electrical device. While balls 43 are shown as being larger than balls 30, the respective size of these members is largely a matter of design choice. Obviously, any desired number of tubes may be assembled and the modificatoins shown are only typical of those available.

Figure 8:
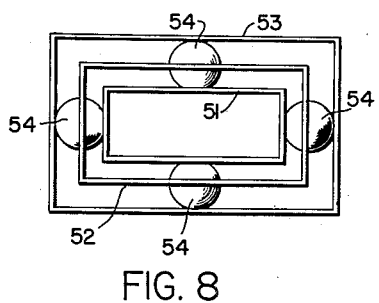
Figure 8 is a plan view of a further modification of the present sensor device.

The tubes shown are cylindrical in shape and this is normally the most convenient type of structure but my invention is not limited to such circular tubes and a perfectly satisfactory device may be made with almost any other suitable shape such as that shown in Figure 8 wherein rectangular tubes are used. It is not even required that the electrodes be completely tubular in shape but only that they be sufficiently curved or otherwise shaped so that, when assembled, the balls will positively hold the members in the desired spaced relationship. In Figure 8, an inner tube 51, an intermediate tube 52 and an outer tube 53 are held in assembled relation by balls 54 in a manner similar to that previously described. In this case, as in the other examples, it is generally preferred to make the spacing between the respective tubes equal from a capacitance standpoint rather than a dimensional standpoint but, obviously, this is not necessary to the proper performance of the apparatus.

Obviously, in the examples as shown in Figures 1, 2 and 3, as well as the other modifications, electrical connections must be made to connectors 37 and 39 and any suitable type of connector is useful in this respect, this part of the apparatus being no part of the present invention.

In conformity with the requirements of the statutes and rules a preferred embodiment of my invention has been shown and described, in addition to some modifications. However, because this invention is susceptible of many variations, its scope should be determined only by the appended claims wherein

I claim:
1. In a liquid level sensor, a first hollow cylindrical member; a second cylindrical member having a smaller diameter than said first member; a third hollow cylindrical member having a larger diameter than said first member; and means supporting said members in concentric relationship for insertion into a liquid container, said means comprising a plurality of radial holes in said first member, a plurality of spherical balls adapted to fit in said holes so that each of said balls has a first portion extending towards said second cylinder and a second portion extending towards said third cylinder, and a plurality of indentations in said second cylinder adapted to receive said first portion of each of said balls to prevent rotary and axial displacement of said balls relative to said second cylinder, and said third cylinder bearing against said second portion of said balls.

2. An electrical measuring device comprising three concentric electrode members, a first of said electrode members having spaced indentations in the surface thereof, a second of said electrode members having spaced holes through the surface thereof, a third of said electrode members engaging a plurality of spherical balls adapted to be seated on said first of said electrode members in said indentations so that said balls cannot move over the surface of said first of said electrode members in any direction without leaving said indentations, said balls extending from said first of said electrode members through said holes in said second of said electrode members to the surface of said third of said electrode members.

3. Means for maintaining concentricity in a plurality of nested cylindrical tubes comprising: a first tube, a second tube, a third tube, a fourth tube and a fifth tube, a first plurality of spherical balls, each of said balls bearing on a surface of said first tube, extending through holes in said second tube and bearing on the inner surface of said third tube; a second plurality of spherical balls, each of said second balls bearing on the outer surface of said third tube extending through holes in said fourth tube and bearing on the inner surface of said fifth tube; and means rigidly positioning said tubes with respect to each other to prevent rotational or axial movement.

4. In a capacitive type liquid level measuring probe, a first cylindrical capacitor plate, said plate having a plurality of radially and axially spaced indentations on the outer surface thereof, a plurality of spherical insulative balls adapted to seat in said indentations, a second hollow cylindrical capacitor plate having a larger diameter than said first plate and adapted to surround said first plate in concentric relationship, said second plate having a plurality of circular holes through the surface thereof placed so as to register with said indentations when in the concentric relationship with said first plate, said balls adapted to fit through said holes when seated in said indentations, a third hollow cylindrical capacitor plate having a larger diameter than said second plate and adapted to surround said first and second plates in concentric relationship, the inner surface of said third plate touching all the said balls, and means rigidly connecting said first plate and said third plate to prevent movement therebetween.

5. In a capacitor, first, second and third curved capacitor plates, said second plate having a plurality of spaced holes therein, a plurality of insulative spherical balls separating said plates, said balls engaging the surface of said first plate, extending through said holes in said second plate and bearing against said third plate and means rigidly positioning said plates in a predetermined relationship with respect to each other to prevent rotational or axial movement therebetween.

6. In a capacitor, a first cylindrical plate, a second hollow cylindrical plate having spaced circular holes in the surface thereof, a third hollow cylindrical plate, means comprising a plurality of spherical insulative balls seated on said first plate, said balls extending through said holes in said second plate and bearing on said third plate, and means rigidly connecting said first and third plates to prevent axial or rotary movement of said third plate.

7. Apparatus of the class described comprising inner, intermediate and outer tubular members, a plurality of spherical insulators adapted to seat on said inner member to prevent said insulators from moving over the surface of said inner member, extend through holes in said intermediate member and rest against the inner surface of said outer member, and means mechanically and electrically connecting said inner and outer members together to form a rigid structure.

References Cited in the file of this patent

UNITED STATES PATENTS

| | | |
|---|---|---|
| 2,231,895 | Foster | Feb. 18, 1941 |
| 2,422,774 | Connor | June 24, 1947 |
| 2,426,252 | Thomson | Aug. 26, 1947 |
| 2,754,349 | Werner | July 10, 1956 |
| 2,759,134 | Sullivan | Aug. 14, 1956 |

FOREIGN PATENTS

| | | |
|---|---|---|
| 17,402 | Great Britain | July 18, 1891 |
| 276,131 | Great Britain | Aug. 25, 1927 |
| 455,731 | Canada | Apr. 5, 1949 |
| 914,417 | Germany | July 1, 1954 |